United States Patent [19]

Narayan

[11] Patent Number: 4,544,763

[45] Date of Patent: Oct. 1, 1985

[54] POLYISOCYANATE BINDER HAVING LOW TOLUENE DIISOCYANATE CONTENT

[75] Inventor: Thirumurti Narayan, Grosse Ile, Mich.

[73] Assignee: Basf Wyandotte Corporation, Wyandotte, Mich.

[21] Appl. No.: 662,934

[22] Filed: Oct. 19, 1984

[51] Int. Cl.[4] .................. C07C 125/06; C07C 119/048
[52] U.S. Cl. ................................ 560/26; 260/453 SP; 252/182; 528/59; 528/492
[58] Field of Search .................... 260/453 SP; 560/26; 528/59, 492

[56] References Cited

U.S. PATENT DOCUMENTS 4,061,662 12/1977 Marans et al. .................... 560/26
4,385,171 5/1983 Schnabel et al. ......... 260/453 SP X

*Primary Examiner*—Dolph H. Torrence
*Attorney, Agent, or Firm*—Joseph D. Michaels

[57] ABSTRACT

Urethane-modified polyisocyanates prepared from toluene diisocyanate are desirable for economic, processing, and product property reasons. Such products should be low in viscosity to allow spray application and low in free TDI content to avoid undue physiological hazard.

By use of prescribed reaction condition and reactant ratios, a suitable product can be prepared from hydroxyl-terminated polyoxyalkylene compounds, toluene diisocyanate, and diphenylmethane diisocyanate.

5 Claims, No Drawings

POLYISOCYANATE BINDER HAVING LOW TOLUENE DIISOCYANATE CONTENT

BACKGROUND OF THE INVENTION

1. Field of the Invention

This invention relates to a polyisocyanate composition based on toluene diisocyanate which can be used as a binder in a spray application without undue physiological hazard.

2. Description of the Prior Art

Urethane modified polyisocyanates are known to the art and find use as adhesives and binders. Such compounds are often prepared from toluene diisocyanate which is more economical (particularly on an NCO equivalent basis) than other commercial diisocyanates and which improves processing and urethane physical properties. However, such products normally contain several percent by weight of unreacted monomeric toluene diisocyanate. This free toluene diisocyanate constitutes a physiological hazard to workers when the product is used, particularly so in spray applications. Attempts to reduce the free toluene diisocyanate content by more complete reaction results in products of higher viscosity which are more difficult to use.

In U.S. Pat. No. 4,061,662, residual free toluene diisocyanate is removed from a urethane prepolymer by adsorbtion with type X zeolite molecular sieves. However, this procedure adds to the cost of the product in equipment, processing, and raw material costs.

I have found that these prior art problems are overcome and the desired product can be achieved by the process and product of this invention.

SUMMARY OF THE INVENTION

A polyisocyanate composition having a free monomeric toluene diisocyanate content of less than one percent by weight prepared by first reacting (a) a hydroxyl-terminated polyoxyalkylene compound having an equivalent weight of from about 800 to about 1200 with (b) toluene diisocyanate at an NCO to OH equivalent ratio of from about 1.1 to about 1.5 to obtain an intermediate product having and NCO content of about 2.1 to about 2.6 percent by weight and thereafter reacting the intermediate product with (c) about 3.0 to about 5.0 equivalents of diphenylmethane diisocyanate per equivalent of (a) for an additional 0.5 hour to 2.0 hours at from 75° C. to 85° C.

DISCLOSURE OF THE PREFERRED EMBODIMENTS

The product of the present invention is obtained by the reaction of a hydroxyl-terminated polyoxyalkylene compound with toluene diisocyanate and diphenylmethane diisocyanates in a specific manner. The polyhydroxyl compound is first reacted with a molar insufficiency (less than one mole per equivalent of hydroxyl) of toluene diisocyanate until the NCO content decreases to from about 2.1 to about 2.6 percent by weight of the intermediate and then with an excess of diphenylmethane diisocyanate for 0.5 hour to 1.0 hour at from 75° C. to 85° C.

The hydroxyl-terminated polyoxyalkylene compounds which are useful in the present invention are derived from alkylene oxides having 2 to 4 carbon atoms such as, for example, ethylene oxide, propylene oxide, 1,2-butylene oxide, 2,3-butylene oxide, or mixtures thereof. The preferred alkylene oxide is propylene oxide. These oxides are reacted with polyhydroxyl initiator such as, for example, ethylene glycol, diethylene glycol, propylene glycol, dipropylene glycol, tripropylene glycol, glycerine, trimethyolpropane, and pentaerythritol. The preferred initiators are difunctional compounds such as, for example, propylene or dipropylene glycol. The alkylene oxide is reacted with the initiator to an equivalent weight of about 800 to about 1200, preferably an equivalent weight of about 1000.

The isocyanates used in preparing the product of this invention are commercialy available toluene diisocyanate and diphenylmethane diisocyanates. The toluene diisocyanate is a mixture of 2,4- and 2,6-isomers. The 80/20 2,4-/2,6-ratio is preferred although the 65/35 mixture or the essentially 100 percent 2,4-isomer (only 2 to 3 percent 2,6-isomer) are also useful. The diphenylmethane diisocyanate used is distilled diphenylmethane diisocyanate which is essentially the "pure" 4,4'-isomer containing a small amount (2 to 3 percent) of the 2,4'-isomer. Isomer mixture containing as much as 25 percent 2,4'-isomer are also useful in the present invention.

The polyhydroxyl compound is reacted with toluene diisocyanate at a ratio of about 0.55 to about 0.75 mole of toluene diisocyanate per equivalent of hydroxyl charged. After reaction of the polyhydroxyl compound and toluene diisocyanate to the desired NCO content, the intermediate is reacted with about 1.5 to about 2.5 moles diphenylmethane diisocyanate per equivalent hydroxyl charged.

Reaction between the polyhydroxyl compound and, initially, the toluene diisocyanate can be achieved thermally by slow addition of the toluene diisocyanate at a temperature of 80° C. over a period of 0.5 to 1.0 hours and then heating the stirred mixture at 80° C. to 100° C. until the NCO content of the mixture drops to about 2.1 to about 2.6 percent by weight. Alternatively, the same extent of reaction can be achieved at a lower temperature of 35° to 70° C., preferably 60° C. to about 70° C., by use of catalytic quantities of a urethane formation catalyst such as, for example, dibutyltin dilaurate, stannous octoate, dibutyltin diacetate, dibutyltin dioctoate, stannous oleate, dibutyltin bis(laurylmercaptide), dibutyltin bis(isooctyl maleate), dibutyltin bis(isooctylmercaptoacetate), or lead napthanate. Dibutyltin dilaurate is the preferred catalyst.

When the desired NCO content is achieved by either process, the diphenylmethane diisocyanate is added and reacted at between 75° C. and 85° C. for 0.5 hour to 2.0 hours.

The following examples show the preferred embodiments of this invention in greater detail. In the example, all parts given are by weight unless otherwise specified. The materials used are as follows:

Polyol A—A 2000 molecular weight polyoxypropylene glycol.
TDI—A low acidity, 80/20 ratio mixture of 2,4- and 2,6—toluene diisocyanate.
MDI—4,4'-diphenylmethane diisocyanate containing a maximum of 2 percent by weight of the 2,4'-isomer.
Catalyst—dibutyltin dilaurate.

COMPARATIVE EXAMPLES

Using the reactant charges and equipmemt described in the procedure given for Examples 1 and 3, comparative examples were carried out under thermal and catalyzed process conditions. The comparative examples show the effects of deviation from the prescribed conditions of the process of this invention. Comparative Examples A and B both show the effect (see Table I) of lower reaction temperature and time on the preparation of the intermediate. Both of these Examples yielded intermediate products with high NCO contents. Subsequent reaction with MDI yielded final products with desirably low viscosities but having free TDI contents which are unacceptable.

Comparative Examples C and D (shown in Table II) shown the effects of process deviation in the catalytic process. Although products containing less than one percent free TDI could be obtained by use of higher temperature and catalyst level, the final products had unsuitably high viscosities (>3500 cps at 25° C.).

EXAMPLES 1-2

(Thermal Process)

Into a clean, dry, nitrogen-purged reactor fitted with an agitator and means for heating, 65.84 parts of Polyol A was charged and heated to 80° C. Toluene diisocyanate (TDI, 7.37 parts) was then added slowly over a period of one hour while maintaining the temperature at 80° C. The reaction mixture was then heated to and

EXAMPLES 3-6

(Catalytic Process)

Using the same equipment and charges as given above, the reaction of polyoxypropylene glycol with toluene diisocyanate (TDI) and diphenylmethane diisocyanate (MDI) was carried out with the additon of using a urethane catalyst. In Example 3, Polyol A was charged to the reactor along with 50 ppm of catalyst and heated to 35° C. TDI was then added at a uniform rate over a 15 minute period and then heated to 70° C. over a total reaction period of 120 minutes. The mixture was stirred and reacted at this temperature for one hour while the NCO content of the intermediate product decreased to 2.28 percent. MDI was then added and the mixture reacted at 80° C. for one hour. The product was then cooled and stabilized with 0.02 part benzoyl chloride. The properties of the final product are shown (Example 3) in Table II. Also shown in Table II are the data from several other preparations (Examples 4, 5, and 6) by the catalytic process in which variation of catalyst level, heat-up time, and reaction time were used while making the low viscosity, low free TDI-containing polyisocyanates of this invention.

TABLE I

| | THERMAL PROCESS | | | | | | |
|---|---|---|---|---|---|---|---|
| | TDI Reaction | | | React. time at 80° C. after | Final Product (after MDI reaction) (1) | | |
| Example | Temperature °C. | Time, min. | Intermediate NCO, % | MDI Addition, min. | NCO % | Viscosity cps/25° C. | Free TDI, % |
| Comp. A | — (2) | — (2) | 4.4 | 60 | 9.8 | 1800 | 3 |
| Comp. B | 80 | 60 | 3.08 | 30 | 9.7 | 1760 | 1.5 |
| 1 | 100 | 60 | 2.58 | 30 | 9.8 | 1925 | <1 (0.7) |
| 2 | 100 | 60 | 2.44 | 60 | 9.8 | 1920 | <1 (0.5) |

(1) After three months storage under ambient conditions, the products of Examples 1 and 2 showed no change in NCO content and less than a ten percent increase in viscosity.
(2) In this example, TDI was added to the polyoxypropylene glycol at 35° to 40° C. over a period of 60 minutes and the mixture rapidly heated to 70° C., sampled for analysis, and the MDI added. There was no hold time at 70° C. for TDI reaction.

TABLE II

| | CATALYTIC PROCESS | | | | | | | |
|---|---|---|---|---|---|---|---|---|
| | Catalyst Used (2) | Time to React. Temp., | TDI Reaction Temperature, | Intermediate, % NCO after reaction for: | | | Final Product (after MDI Reaction) (1) | | |
| Example | ppm | min. | °C. | 1 hr. | 2 hr. | 3 hr. | NCO, % | Viscosity, cps/25° C. | Free TDI, % |
| Comp. B | 65 | 40 | 75 | 1.5? | | | 9.9 | 7800 | <1 |
| Comp. D | 87 | 30 | 70 | 2.03 | | | 9.6 | 3584 | |
| 3 | 50 | 120 | 70 | 2.28 | | | 9.7 | 2420 | |
| 4 | 65 | 30 | 60 | 2.33 | 2.23 | | 9.6 | 2416 | |
| 5 | 50 | 120 | 60 | 2.75 | — | 2.27 | 9.7 | 2380 | |
| 6 | 50 | 30 | 60 | 2.90 | 2.57 | 2.35 | 9.7 | 2228 | <1 |

(1) After three months storage under ambient conditions, the products of Examples 3-6 showed no change in NCO content and less than a ten percent increase in viscosity.
(2) Catalyst concentration is based on the TDI, polyol and pure MDI used.

maintained at 100° C. for one hour while the NCO content of the intermediate product decreases to 2.58 percent by weight as measured by dibutylamine titration. The intermediate product was then cooled to 80° C. and 26.77 parts of diphenylmethane diisocyanate (MDI) was added and reacted for 30 minutes at 80° C. The final product was stabilized by addition of 0.02 parts benzoyl chloride. The properties of the final product (Example 1) are given in Table I. Also shown in Table I are results from a second preparation by the thermal process (Example 2) which differed from Example 1 as shown in Table I.

The embodiments of the invention in which an exclusive privilege or property is claimed are defined as follows:

1. A polyisocyanate composition having a free monomeric toluene diisocyanate content of less than one percent by weight prepared by first reacting (a) a hydroxyl-terminated polyoxyalkylene compound having an equivalent weight of from about 800 to about 1200 with (b) toluene diisocyanate at an NCO to OH equivalent ratio of from about 1.1 to about 1.5 to obtain an intermediate product having an NCO content of about 2.1 to about 2.6 percent by weight and thereafter reacting the intermediate product with (c) about 3.0 to about 5.0 equivalents of diphenylmethane diisocyanate per equivalent of (a) for an additional 0.5 hour to 2.0 hours at from 75° C. to 85° C.

2. The polyisocyanate composition of claim 1 wherein the reaction of toluene diisocyanate and the hydroxyl-terminated polyoxyalkylene compound is conducted thermally at a reaction temperature of 90° C. to 100° C.

3. The polyisocyanate composition of claim 1 wherein the reaction of toluene diisocyanate and the hydroxyl-terminated polyoxyalkylene compound is conducted at a reaction temperature of from about 35° C. to about 70° C. in the presence of a catalytic amount of a urethane reaction catalyst.

4. The polyisocyanate composition of claim 1 wherein the hydroxyl-terminated polyoxyalkylene compound is a polyoxypropylene glycol.

5. The polyisocyanate composition of claim 4 wherein the polyoxypropylene glycol has an equivalent weight of about 1000.

* * * * *